(12) United States Patent
Etemad

(10) Patent No.: US 12,160,021 B2
(45) Date of Patent: Dec. 3, 2024

(54) METHOD FOR WELDING CELL INTERCONNECTORS, AND WELDING ELECTRODE ARRANGEMENT FOR SAID METHOD

(71) Applicant: Clarios Germany GmbH & Co. KG, Hannover (DE)

(72) Inventor: Ramin Etemad, Neustadt am Rübenberge (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 555 days.

(21) Appl. No.: 17/419,069

(22) PCT Filed: Dec. 24, 2019

(86) PCT No.: PCT/EP2019/087011
§ 371 (c)(1),
(2) Date: Jun. 28, 2021

(87) PCT Pub. No.: WO2020/136195
PCT Pub. Date: Jul. 2, 2020

(65) Prior Publication Data
US 2022/0069423 A1 Mar. 3, 2022

(30) Foreign Application Priority Data
Dec. 28, 2018 (DE) .................... 102018133644.6

(51) Int. Cl.
*H01M 50/516* (2021.01)
*H01M 10/12* (2006.01)
*H01M 50/536* (2021.01)

(52) U.S. Cl.
CPC ......... *H01M 50/516* (2021.01); *H01M 10/12* (2013.01); *H01M 50/536* (2021.01); *H01M 2220/20* (2013.01)

(58) Field of Classification Search
CPC .. H01M 50/516; H01M 10/06; H01M 50/172; H01M 50/529; H01M 10/12; H01M 50/536; H01M 50/541
See application file for complete search history.

(56) References Cited

U.S. PATENT DOCUMENTS 4,171,564 A * 10/1979 Acton et al. .......... H01M 10/38
29/623.2
4,429,208 A 1/1984 Eberle
(Continued)

FOREIGN PATENT DOCUMENTS

DE 2455348 A1 5/1975

OTHER PUBLICATIONS

International Search Report and Written Opinion of the International Searching Authority dated Oct. 13, 2020 for PCT/EP2019/087011 filed Dec. 24, 2019, 12 pages (translated).
(Continued)

*Primary Examiner* — Haroon S. Sheikh
*Assistant Examiner* — Kan Luo
(74) *Attorney, Agent, or Firm* — Boardman & Clark LLP

(57) ABSTRACT

Welding electrode arrangement and method for welding one interconnector of two adjacent electrochemical cells of a rechargeable battery. The two electrochemical cells are disposed to be separated by means of a housing partition. The interconnectors are disposed to face one another on two opposite sides of the housing partition. An opening is disposed in a region of the housing partition. The method comprises contacting the interconnectors with a welding electrode arrangement. The welding electrode arrangement has at least one pair of welding electrodes. One welding electrode of the at least one pair of welding electrodes contacts in each case one of the interconnectors by means of an insert part. The method further comprises welding the
(Continued)

interconnectors in such a manner that the material of the interconnectors melts at least in regions and is connected in a materially bonded manner through the opening in the housing partition.

27 Claims, 4 Drawing Sheets

(56) References Cited

U.S. PATENT DOCUMENTS

| | | |
|---|---|---|
| 4,485,959 A | 12/1984 | Orlando et al. |
| 2012/0079713 A1* | 4/2012 | Hosokawa et al. ... H01M 10/04 29/623.2 |

OTHER PUBLICATIONS

International Preliminary Report on Patentability of the International Bureau of WIPO dated Jun. 16, 2021 for PCT/ EP2019/ 087011 filed Dec. 24, 2019, 8 pages (translated).

* cited by examiner

METHOD FOR WELDING CELL INTERCONNECTORS, AND WELDING ELECTRODE ARRANGEMENT FOR SAID METHOD

CROSS-REFERENCE TO RELATED APPLICATIONS

This application is a national phase filing of International Patent Application No. PCT/EP2019/087011, entitled "METHOD FOR WELDING CELL INTERCONNECTORS, AND WELDING ELECTRODE ARRANGEMENT FOR SAID METHOD," which has an international filing date of Dec. 24, 2019; and claims priority to German Patent Application No. 102018133644.6, filed Dec. 28, 2018, the entire contents of each of which is hereby incorporated herein by reference for all purposes.

The present patent application relates to a method for welding interconnectors of a lead-acid rechargeable battery, to the lead-acid rechargeable battery, and to a welding electrode arrangement for said method.

A lead-acid battery or a lead-acid rechargeable battery for a vehicle conventionally has a housing which comprises a multiplicity of chambers. These chambers are separated from one another by means of housing partitions. An electrochemical cell is received or disposed in each of the chambers (in the installed state of the lead-acid rechargeable battery), wherein an electrochemical cell has in each case a multiplicity of positive and negative electrode plates which are separated from one another by a separator, in particular electrically separated from one another, and an electrolyte. The positive and negative electrode plates can be covered with a positive or negative pasty active material, and a pasty non-woven material which keeps the active material on the respective electrode plate and prevents the active material from becoming detached from the electrode plate can optionally be disposed on the active material. In order to tap or supply electrical current by means of the terminals of the lead-acid rechargeable battery, the individual electrochemical cells are electrically connected to one another, so that a series and/or parallel connection of the multiplicity of electrochemical cells can be formed. For this purpose, interconnectors of two adjacent electrochemical cells are welded to one another through the housing partition that separates the adjacent electrochemical cells. The interconnectors are designed in such a way that they are electrically connected to the multiplicity of positive electrode plates or the multiplicity of negative electrode plates.

Since the housing of the lead-acid rechargeable battery is mainly made of a plastic material in order to save weight, and the melting point of the interconnectors made of lead or a lead alloy is higher than the melting point of the plastic material, plastics inclusions occur when the interconnectors of two adjacent electrochemical cells are welded together in the welding area. Such plastics inclusions represent a qualitative defect in a welding area and thereby reduce the strength of the welding area. In conventional lead-acid rechargeable batteries, the proportion of plastics inclusions in the welding area is approximately 50% of the welding area.

The object of the invention is therefore to provide a method for welding interconnectors which reduces the proportion of enclosed plastics inclusions in the welding area and which at the same time can be implemented simply and inexpensively.

The object on which the present invention is based is achieved in particular by the subject matter of the independent patent claims. Advantageous refinements are specified in the dependent patent claims.

Thus, the subject matter of independent claim 1 relates to a method for welding interconnectors of two electrochemical cells of a lead-acid rechargeable battery which are spaced apart from one another by means of a housing partition.

The two electrochemical cells here are disposed so as to be separated from one another by means of a housing partition, wherein the interconnectors are disposed so as to face one another on two opposite sides of the housing partition. In other words, the two interconnectors are disposed on two opposite sides of the housing partition in such a manner that said two interconnectors are at least substantially congruent opposite one another. An opening is disposed in a region of the housing partition where the interconnectors are opposite one another. The method comprises the following steps: contacting the interconnectors with a welding electrode arrangement and welding the interconnectors.

The welding electrode arrangement here has at least one pair of welding electrodes, wherein one welding electrode of the at least one pair of welding electrodes contacts in each case one of the interconnectors by means of an insert part. The welding of the interconnectors here takes place in such a manner that, by means of a pressure applied by the insert parts of the welding electrodes and a current applied to the welding electrode arrangement, the material of the interconnectors melts at least in regions and is connected in a materially bonded manner through the opening in the housing partition, specifically so that the welding area generated has an area proportion of plastics inclusions of at most 8% in the welding area.

The advantages of the present invention are evident. In particular, the quality of the weld can be increased by using an insert part according to the invention for a welding electrode. In particular, the connection strength and electrical conductivity are improved.

Furthermore, only replacing or changing of the insert part is necessary, while the remaining elements of the conventional welding electrode arrangement can continue to be used.

This means that even welding electrode arrangements that have already been put into operation can be retrofitted easily, inexpensively and quickly, which can reduce the manufacturing, production and assembly costs. Furthermore, the downtime can be limited to less than 5 minutes, whereby an interruption in the operation of the welding electrode arrangement can be limited to a minimum, which further contributes to a reduction in assembly costs, which also includes costs for necessary downtimes.

In this way, the quality of the rechargeable battery can also be increased and improved.

According to a further aspect of the invention, the area proportion of plastics inclusions in the welding area is less than 8%, in particular less than 4%.

As a result, the quality of the weld—and in particular the electrical conductivity caused by this weld and the strength of the connection—can be further improved, so that a more robust connection with better electrical properties can be ensured.

According to a further aspect of the invention, the insert part has been calculated and simulated using the finite element method.

This means that weak points in the conventional insert part can be found and prevented easily and inexpensively. This leads to an improved welding area and thus to a higher quality of the weld.

According to a further aspect of the invention, the insert part of each welding electrode has a welding protrusion which has a shape which has been calculated and simulated in such a manner that the area proportion of plastics inclusions in the welding area is at most 8%, preferably less than 8%, particularly preferably less than 4%, of the welding area.

This guarantees that fewer rejects are produced, which further reduces manufacturing costs.

According to a further aspect of the invention, the welding protrusion has a recess so that the cross section of the welding protrusion is at least substantially U-shaped or C-shaped.

In this way, the weak points caused by the conventional insert part or conventional welding protrusion are avoided, which leads to an increase in quality.

According to a further aspect of the invention, the welding protrusion has a contacting face which has an at least substantially U-shaped or C-shaped cross section, wherein the welding protrusion is configured so as to taper toward the contacting face.

In this way, the weak points caused by the conventional insert part or conventional welding protrusion are avoided, which leads to an increase in quality.

According to a further aspect of the invention, the interconnectors are welded by means of a through-the-partition (TTP) welding method.

This is a method that is easy to carry out, as a result of which the production costs can be further reduced.

According to a further aspect of the invention, the interconnectors are welded at a welding temperature of 300° C. to 380° C., in particular 300° C. to 360° C., preferably 300° C. to 340° C., particularly preferably 300° C. to 320° C.

In particular, the welding temperature is in the range of the melting point of the interconnectors (±5° C.) or only slightly (i.e., about 5° C. to 15° C.) above the melting point of the interconnectors, as a result of which negative effects on the material of the housing partition, which has a lower melting point than the material of the interconnectors, can advantageously be reduced. This guarantees that there are fewer stresses in the housing partition during the welding method and thus fewer plastics inclusions in the welding area.

According to a further aspect of the invention, the housing partition is made of plastics material which has a melting point of 200° C. to 250° C., in particular 220° C.

According to a further aspect of the invention, the housing partition is made of polyethylene, polypropylene, polyamide, polyoxymethylene or a copolymer thereof.

This guarantees electrical insulation of the rechargeable battery in a simple and inexpensive manner, and at the same time the weight of the rechargeable battery can also be reduced.

According to a further aspect of the invention, the welded interconnectors withstand a torque of at least 12 Nm, in particular of at least 16 Nm.

The quality of the weld produced can thus be further increased.

Specified according to a further aspect of the invention is a lead-acid rechargeable battery that has a housing with a multiplicity of chambers which are separated from one another by means of a multiplicity of housing partitions and has a multiplicity of electrochemical cells, wherein one electrochemical cell is in each case disposed in a corresponding chamber, and wherein each electrochemical cell has two interconnectors for configuring an electrical connection.

One interconnector of a first electrochemical cell and one interconnector of a second adjacent electrochemical cell here are in each case disposed opposite one another on two opposite sides of a housing partition that spatially separates the first and the second electrochemical cells from one another. Furthermore, the housing partition in a region where the interconnectors are located opposite one another has an opening by way of which the interconnectors, preferably by means of the method described above, are connected, or in particular welded, to one another, wherein the connecting face, or in particular the welding area, has an area proportion of plastics inclusions of at most 8% of the welding area.

This advantageously has the consequence that a lead-acid rechargeable battery with improved electrical and mechanical characteristics can be provided, said lead-acid rechargeable battery moreover being able to be produced in a simple and cost-effective manner.

According to a further aspect of the invention, the welded interconnectors withstand a torque of at least 12 Nm, in particular of at least 16 Nm.

Furthermore, the subject matter of coordinate patent claim 14 relates to a welding electrode arrangement for welding in each case one interconnector of two adjacent electrochemical cells of a rechargeable battery, in particular a lead-acid rechargeable battery.

The interconnectors here are separated from one another by means of a housing partition and are disposed opposite one another on opposite sides of the housing partition, wherein the housing partition has an opening in a region where the interconnectors are opposite one another.

To this end, the welding electrode arrangement has at least one pair of welding electrodes, wherein each welding electrode of the at least one pair of welding electrodes has an insert part which is conceived to contact a corresponding interconnector, and to weld the interconnectors through the opening in the housing partition in such a manner that an area proportion of plastics inclusions in the welding area is at most 8% of the welding area.

The quality of the weld can in particular be enhanced by using an insert part according to the invention for a welding electrode arrangement. The strength of the connection and the electrical conductivity are in particular improved.

Furthermore, it is only necessary to replace or change the insert part, while the other elements of the conventional welding electrode arrangement can continue to be used.

Welding electrode arrangements which have already been commissioned can thus also be retrofitted in a simple, cost-effective and rapid manner, this potentially lowering the costs in terms of manufacturing, producing and assembling. Furthermore, the downtime can be limited to fewer than 5 minutes, as a result of which an interruption of the operation of the welding electrode arrangement can be limited to a minimum, this further contributing toward lowering the assembling costs, the latter also including the costs for necessary downtime.

In this way, the quality of the rechargeable battery can also be increased and improved.

According to a further aspect of the invention, the insert part has been calculated and simulated using a finite element method.

This means that weak points in the conventional insert part can be found and prevented easily and inexpensively. This leads to an improved welding area and thus to a higher quality of the weld.

According to a further aspect of the invention, the insert part has a welding plate, on the front side of which is formed a welding protrusion that extends from the welding plate.

According to a further aspect of the invention, the welding protrusion has a recess.

The detected weak points of the conventional welding protrusion are circumvented with the aid of this recess, as a result of which a weld which has enhanced or better mechanical characteristics as well as enhanced or better electrical characteristics can be generated.

According to a further aspect of the invention, the welding protrusion has at least substantially the shape of a prism with a footprint of a round-fronted rectangle, and the recess has at least substantially the shape of a prism with a trapezoidal footprint.

According to a further aspect of the invention, the welding protrusion has a contacting face for contacting the interconnector, wherein the welding protrusion is configured so as to taper toward the contacting face.

According to a further aspect of the invention, the contacting face has an at least substantially U-shaped or C-shaped cross section.

According to a further aspect of the invention, there is on the rear side of the welding plate an elevation for introducing the insert part into a groove, configured in the welding electrode so as to be complementary to the elevation, wherein the insert part by means of a fastening bore which is disposed on the rear side of the welding plate is able to be fastened to, or is fastened to, the welding electrode.

As a result thereof, changing or replacing the insert part can take place in a simple (and in particular releasable) manner, this potentially lowering the costs for assembling and the time required for the latter. Moreover, the centering of the insert part is simplified.

According to a further aspect of the invention, the welding protrusion and/or the elevation are/is configured so as to be integral to the welding plate.

As a result thereof, the manufacturing costs of the insert part can advantageously be lowered because said insert part can be manufactured in a cost-effective manner, for example, by means of a casting process with optionally subsequent post-machining.

The invention, also in terms of further features and advantages, will be explained in more detail hereunder by means of the description of embodiments with reference to the appended drawings.

The method according to the invention, and the welding electrode arrangement according to the invention, will be described in more detail hereunder with reference to the illustrations in FIGS. 1 to 7. Identical or equivalent elements and functions here are provided with the same or similar reference signs.

The power supply of a vehicle, in particular with electricity, is becoming ever more important as the number of power consumers, in particular electrical consumers, continuously increases, specifically in vehicles based on internal combustion engines as well as in electric vehicles and in hybrid vehicles. High currents which are provided by a starter battery of the vehicle arise in particular when starting an internal combustion engine.

The vehicle here can be an aircraft or a water craft, a track-guided vehicle, an offroad vehicle or preferably a road vehicle, wherein a road vehicle can be understood to be a passenger motor vehicle, a commercial motor vehicle, a bus or a recreational vehicle. Hybrid vehicles can furthermore be understood to be any vehicle which has an internal combustion engine as well as an electric motor as a power source. Hybrid vehicles can be subdivided into micro-hybrid, mild hybrid, full hybrid and plug-in hybrid vehicles.

Lead-acid batteries, or lead-acid rechargeable batteries, are particularly used as starter batteries. These batteries are conceived for providing the electric current is required for starting the engine. A construction form of a lead-acid rechargeable battery is, for example, an absorbent glass mat (AGM) rechargeable battery in which the electrolyte is bound in a non-woven material from glass fibers. In comparison to wet rechargeable batteries in which the electrolyte is present in liquid form, AGM rechargeable batteries have the advantage that no electrolyte can leak even when the rechargeable battery is tilted. AGM rechargeable batteries are furthermore distinguished by a low internal resistance.

The lead-acid rechargeable battery and the welding electrode arrangement hereunder are described in such a manner that relative terms relate to the installed state of the lead-acid rechargeable battery. For example, "in an upper region" thus means in an upper region when viewed in the installed state of the lead-acid rechargeable battery, "in a lateral region" means in a region which in the installed state and when viewed in the direction of travel is situated in a front, rear, left or right region, and "in a lower region" means in a lower region when viewed in the installed state.

Figure 1:
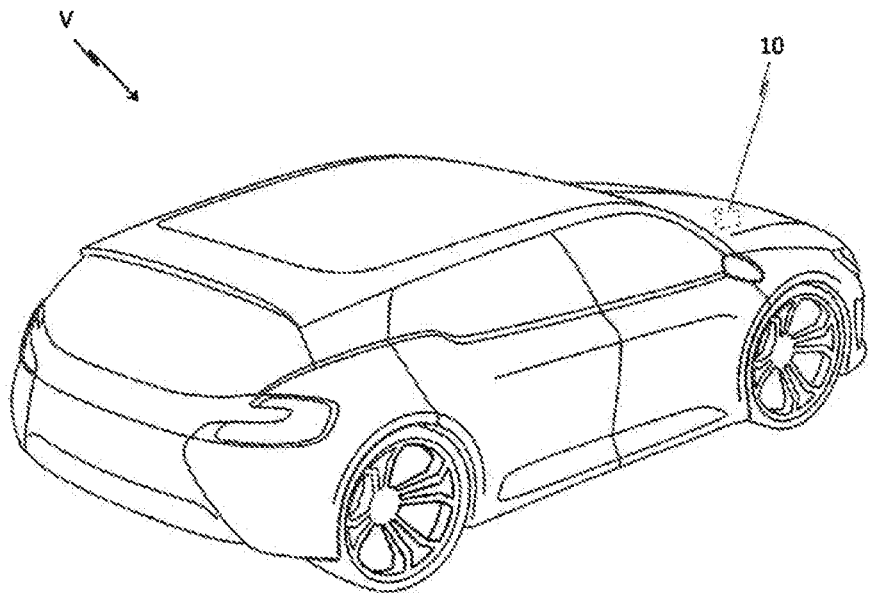
FIG. 1 shows a schematic illustration of a vehicle.

FIG. 1 shows a schematic illustration of a vehicle V. The lead-acid rechargeable battery 10 here, when viewed in the direction of travel, can be situated in a front region of the vehicle V, in a rear region of the vehicle V, and/or in a region below the seats, in particular below the driver's seat.

According to the illustration in FIG. 1, the lead-acid rechargeable battery 10 is disposed in a front region of the vehicle, in particular in a front engine bay below the front hood.

The lead-acid rechargeable battery 10 has a housing which is configured for receiving a multiplicity of electrochemical cells. To this end, the housing has a housing lower part which defines an interior space, the upper side, or upper lateral face of said housing lower part being open in the installed state, and a cover which is configured for closing the upper side of the housing lower part that is open in the installed state.

The housing lower part furthermore has a multiplicity of housing partitions which are disposed in such a manner that the interior space of the housing lower part is subdivided into a multiplicity of chambers, each of the latter being configured for receiving one electrochemical cell.

The housing lower part and the cover are connectable, or connected, in particular weldable, or welded, to one another in such a manner that a connection which is sealed in relation to liquids and gases, or gas mixtures, can be established To this end, the cover can be connected to the housing lower part in particular in a materially bonded and/or force-fitting manner. For example, the cover can be connected to the housing lower part by way of a screw connection.

The cover here can have a positive terminal and a negative terminal which can be electrically and mechanically connected to electrical consumers or loads. Instead of the positive terminal and the negative terminal, the cover may however likewise have an at least substantially planar positive electrical contacting face and negative electrical contacting face. The size, and in particular the height, of the lead-acid rechargeable battery 10 can advantageously be reduced as a result thereof.

The housing, that is to say the housing lower part including the housing partitions and the cover, can at least in regions, in particular completely, be made from plastics material so as to be able to design the lead-acid rechargeable battery 10 to be as light as possible. Polyolefin, acrylonitrile butadiene styrene, polycarbonate, polyamide, polyvinylchloride, polyethylene terephthalate, polyoxymethylene or a copolymer thereof can be chosen as a material here, for example. The housing of the lead-acid rechargeable battery 10 can in particular be made from polyamide, polypropylene or polyethylene or a copolymer thereof.

The material of the housing here has a melting point of 120° C. to 260° C., in particular 150° C. to 250° C., preferably 200° C. to 250° C., particularly preferably 220° C. to 240° C., in particular approximately 220° C. In the context of the present application, approximately 220° C. means 220° C.±5°.

However, it is also likewise conceivable for only the housing partitions to be made from a plastics material described above. The housing lower part and/or the cover can be made from a metal or a metal alloy. However, an electrical isolation of the housing has to be additionally provided or disposed and guaranteed here.

Each electrochemical cell has a multiplicity of positive electrode plates and a multiplicity of negative electrode plates, wherein the multiplicity of positive electrode plates and the multiplicity of negative electrode plates are disposed in an alternating manner and so as to be in each case spaced apart from one another and electrically separated by means of a separator.

The positive electrode plates can be covered with a positive pasty active compound which can optionally be covered with a pasty non-woven material which holds the positive pasty active compound on the positive electrode plate and prevents the positive pasty active compound from being detached. In an analogous manner, the negative electrode plates can be covered with a negative pasty active compound which in turn can be covered with a pasty non-woven material which holds the negative pasty active compound on the negative electrode plate and prevents the negative pasty active compound from detaching from the negative electrode plate.

The electrochemical cell furthermore has an electrolyte. The latter can be present in the form of a liquid. It is likewise also possible for an electrolyte that is bound in a glass-fiber non-woven material to be used. Reference is also made to an absorbent glass mat (AGM) rechargeable battery when an electrolyte that is bound in a glass-fiber non-woven material is used.

Each electrochemical cell moreover has one pair of interconnectors. In particular, each electrochemical cell has a positive interconnector which has an electrical connection to the multiplicity of positive electrode plates, or is electrically connected to the multiplicity of positive electrode plates, and a negative interconnector which has an electrical connection to the multiplicity of negative electrode plates, or is electrically connected to the multiplicity of negative electrode plates. An electric current is discharged from the corresponding electrochemical cell or supplied to the latter, respectively, by means of the positive interconnector and the negative interconnector.

The interconnectors of two adjacent electrochemical cells which are separated from one another by means of a housing partition are electrically connected to one another by way of the partition, in particular through an opening in the partition, so that the multiplicity of electrochemical cells are connected to one another in series and/or in parallel. The total current, or the total voltage, which can be discharged by the lead-acid rechargeable battery 10 is determined by means of this connection. The nominal voltage of the lead-acid rechargeable battery 10 is in particular approximately 12 V. To this end, the multiplicity of electrochemical cells are electrically connected to one another in particular in series.

In order for the multiplicity of electrochemical cells to be connected in series, the positive interconnector of a first cell is electrically connected to the negative interconnector of a second adjacent electrochemical cell. In an analogous manner, the positive interconnector of the second electrochemical cell is electrically connected to the negative interconnector of a third electrochemical cell, adjacent to the second electrochemical cell, etc. The negative interconnector of the first cell is electrically connected to the negative terminal of the lead-acid rechargeable battery 10. The positive interconnector of the last electrochemical cell is electrically connected in an analogous manner to the positive terminal of the lead-acid rechargeable battery 10 so that the cumulative voltage of the individual electrochemical cells can be tapped by way of the negative terminal and the positive terminal of the lead-acid rechargeable battery 10.

In order for the interconnectors of two adjacent electrochemical cells to be electrically connected to one another, an opening through which the interconnectors of the adjacent electrochemical cells are electrically connected to one another is provided or disposed in the housing partition. A welded connection is in particular configured between the interconnectors of the adjacent electrochemical cells.

To this end, an interconnector of a first electrochemical cell is welded using a through-the-partition (TTP) welding method to an interconnector of a second electrochemical cell which by means of the housing partition is spaced apart from the first electrochemical cell, said welding taking place through the opening in the housing partition.

The electrical contacting of two interconnectors of two adjacent electrochemical cells which are separated from one another by means of a housing partition takes place in particular in such a manner that an opening is disposed in the housing partition, specifically where the two interconnectors of the respective cells are opposite one another.

In other words, the interconnectors to be connected or welded, respectively, are disposed so as to be at least substantially congruent on two opposite sides of the housing partition, in a welding region of the housing partition. In this context, "substantially congruent" means that the contours of the interconnectors on two opposite sides of the housing partition overlap by way of at least 90% of the area enclosed by said contours, or that the contours of the interconnectors are disposed so as to be (completely) congruent on the two opposite sides of the housing partition.

Furthermore, the opening is disposed in the welding region. The opening has a contour of a rectangle with rounded corners, or of a round-fronted rectangle. A round-fronted rectangle is understood to be a rectangle of which the end sides, or the shorter sides, respectively, are at least substantially semicircular or rounded, respectively. The opening has in particular a shaping of such a type that the longer side of the opening is smaller than the width of the interconnectors such that the opening is completely covered by the interconnectors and closed by the latter.

For example, the opening can have an area of 80 mm² to 120 mm², in particular 90 mm² to 100 mm².

The interconnectors of the multiplicity of electrochemical cells here are made from lead or a lead alloy. The melting point of lead, or of the lead alloy, is in the range from approximately 300° C. to 350° C.

In order for the method known as the TTP welding method to be carried out, a welding arrangement according to the invention is used. The welding arrangement here has at least one pair of welding electrodes according to the invention. One pair of welding electrodes here is in each case conceived for establishing a welded connection; that is to say that six welded connections can be carried out, in particular simultaneously, using one welding electrode arrangement with six pairs of welding electrodes. One control unit for monitoring and controlling the welding procedure can be assigned to each pair of welding electrodes here. It is likewise also conceivable for a (central) control unit to be provided or disposed, said (central) control unit monitoring and controlling all pairs of welding electrodes.

The method according to the invention and the welding electrode arrangement according to the invention will be explained in more detail hereunder by way of an example having one pair of welding electrodes. This embodiment is of course purely exemplary and in an analogous manner applies also to welding electrode arrangements having at least one pair, or a plurality of pairs, of welding electrodes according to the invention.

In one exemplary embodiment, the welding electrode arrangement has one pair of welding electrodes. Each welding electrode on a distal end has a specifically configured insert part 100. The welding electrode arrangement is in particular disposed in such a manner that one welding electrode having a specifically embodied insert part 100 engages in each case on one corresponding interconnector, specifically in such a manner that the insert parts 100 of the welding electrodes contact the interconnectors and compress the latter.

The pair of welding electrodes can in particular be embodied as a type of clamps, the latter being able to apply a predetermined force to the interconnectors. For example, the interconnectors can be pressed against one another with a force of 4 kN to 10 kN, in particular with 5 kN to 6 kN.

An electric current is then supplied to the welding electrodes in such a manner that a welding temperature of approximately 300° C. to 380° C., in particular 300° C. to 360° C., particularly preferably 300° C. to 320° C., is achieved. By way of a suitable sensor assembly, this can be checked in a simple manner by means of a control unit which is connected to and communicates with the pair of welding electrodes, and be maintained by means of corresponding controlling.

When the welding temperature is reached, the interconnectors are melted at least in regions at the location where the insert part 100 bears on the interconnectors. As a result of the pressure applied by means of the welding electrodes, at least part of the melted material of the interconnectors is pressed into the opening in the housing partition so that the interconnectors disposed on both sides of the housing partition are fused to one another.

After a predetermined melting time, the welding electrode is still held to the interconnectors for a defined holding time without current being supplied but while applying a predetermined contact pressure, such that the fusing, or the materially bonded connection, of the interconnectors in the opening can be guaranteed. This creates a weld of the interconnectors after the melted material of the interconnectors has solidified. In the context of this application, welding is understood to be the materially bonded connection of the interconnectors after carrying out the welding procedure, wherein the connection is defined or distinguished by a welding area produced between the interconnectors.

The created welding area corresponds at least substantially to the area of the opening in the housing partition and preferably lies in one plane with said opening. Furthermore, the welding area has a contour which corresponds at least substantially to the circumference of the opening.

Because the melting temperature of the housing, and in particular of the housing partition, is significantly below the welding temperature, or the welding temperature range, respectively, the housing partition at least in regions is melted in a region about the opening during welding. In this context, the term "significantly below" is understood to be a temperature difference of at least 100° C., in particular approximately 100° C. to 150° C., between the material of the interconnectors and the material of the housing partition.

By virtue of the pressure applied by the welding electrodes and the stresses created as a result thereof, it can arise that parts of the melted material of the housing partition make their way into the opening.

Plastics inclusions which diminish the quality of the weld can thus be created in the welding area.

Thus, on the one hand, the strength of the weld is diminished by a large plastics inclusion, and the electrical conductivity is also reduced, on the other hand.

Figure 7:
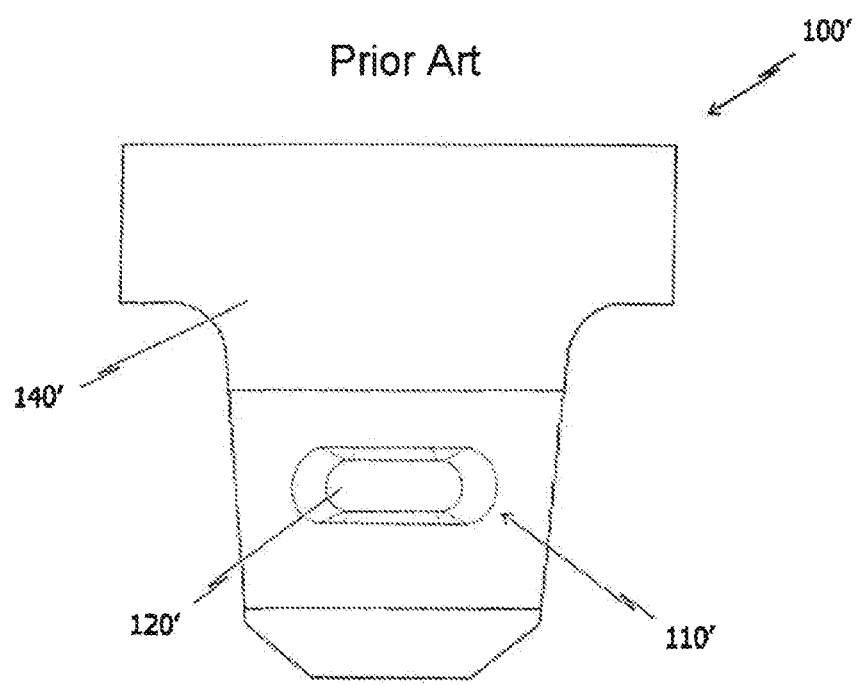
FIG. 7 shows a schematic illustration of a front view of a conventional insert part for a welding electrode.

In this context, FIG. 7 shows a conventional insert part 100' for a welding electrode. The conventional insert part 100' for this purpose has a welding plate 140' on which a conventional welding protrusion 110' is disposed. The conventional welding protrusion 110' by way of a contacting face 120' contacts the element to be welded, specifically an interconnector.

The conventional contacting face 120' here has at least substantially the shape of a rectangle with rounded corners, or the shape of a round-fronted rectangle. This means that the end sides, that is to say the short sides of the rectangle, are in particular embodied so as to be semicircular.

In other words, the conventional contacting face 120' has at least substantially a shape which corresponds to the contour of the opening.

During the welding procedure here, the material of the housing partition increasingly melts about the opening. Carrying out the TTP welding method using a conventional insert part 100' here leads in particular to an increase in terms of the plastics inclusions in the welding area.

When using the conventional insert part 100', the area proportion of the plastics inclusions after the welding procedure is in particular 50% or more of the welding area.

This represents a considerable quality issue, because the strength of the weld (that is to say the welded elements) as well as the electrical conductivity of the weld, or of the welded interconnectors, are negatively influenced and in particular diminished.

In order for the area proportion of plastics inclusions to be reduced, an insert part 100 according to the invention which is illustrated in FIGS. 2 to 6 is herewith specified.

The TTP welding procedure has in particular be simulated by means of a finite element method (FEM), and the weak points of the conventional insert part 100' have been optimised in such a manner that lower stresses are applied to the region about the opening in the housing partition during the welding procedure, or lower stresses are present in the region about the opening in the housing partition, respectively, this leading to reduced plastics inclusions in the welding area created.

In particular, the contacting face 120 according to the invention, proceeding from the conventional contacting face 120', is optimized by means of the finite element method in such a manner that the area proportion of the plastics inclusions in the created welding area is at most 8%, in particular less than 8%, preferably less than or equal to 4%, of the entire welding area. The area proportion of the plastics inclusions in the created welding area is particularly preferably at least substantially 0%, that is to say that no plastics inclusions are present in the created welding area.

This has the advantage that the electrical conductivity of the weld, or of the welded interconnectors, respectively, is improved, while the strength of the weld is also increased. The weld is in particular to be able to withstand a (torsional) torque of at least 12 Nm before the weld fails.

To this end, the contacting face 120 of the welding protrusion 110 according to the invention on the welding plate 140 can have at least substantially the shape of a "U" with short legs, or at least substantially the shape of a banana or a boomerang.

In other words, the contacting face 120 according to the invention, in comparison to the conventional, at least substantially round-fronted rectangular, contacting face 120', has a recess 130 so that the welding temperature created during the welding procedure is at least in regions lower, as a result of which the stresses between the opening in the housing partition and the interconnector are reduced during welding.

The recess 130 is preferably disposed at a location where the highest voltages and temperatures in the welding procedure using the conventional welding electrode, or using the conventional insert part 100', respectively, have been detected and determined in the simulation by means of the FEM method. In other words, the recess 130 is disposed at a location where the majority of the plastics inclusions are created in the welding area. An insert part 100 optimized in such a manner can, in particular, decrease or reduce the contact between the melted material of the interconnectors and the material of the housing partition in a region about the opening, this leading to lower stresses in the housing partition and less melting of the housing partition.

As a result, the proportion of plastics inclusions in the created welding area can be reduced, while at the same time the strength of the weld or of the welded interconnectors is not adversely affected. In particular, the interconnectors welded by means of an insert part according to the invention can withstand a (torsional) torque between the interconnectors that is greater than the specification value of 11 Nm. In particular, the welding area between the interconnectors only fails at approximately 16 Nm.

In particular, the contour of the contacting face 120 is configured so as to be continuous, that is to say at least substantially without corners and angles To this end, all (acute) corners and angles are designed to be rounded, so that the contour of the contacting face 120 and the envelope surface of the welding protrusion 110 have a soft profile. A soft profile is understood to mean that no corners, sharp edges and/or angles arise in a surface or a contour or circumference. This can prevent stresses being applied to the housing partition or at least being reduced during a welding procedure.

Figure 2:
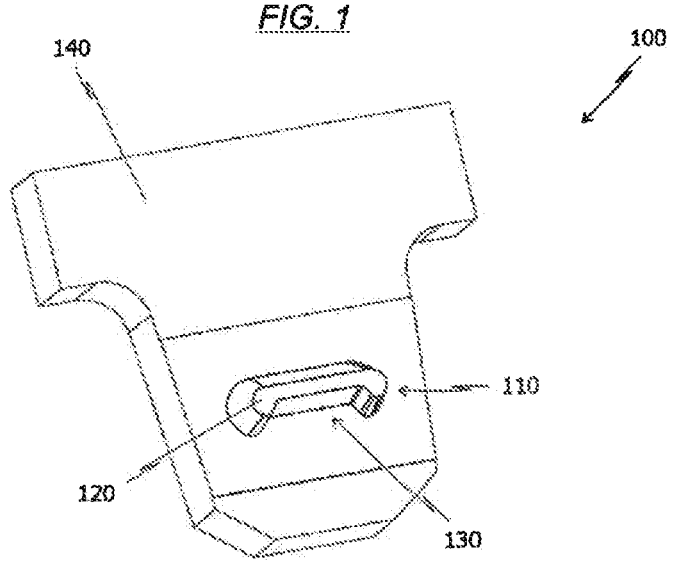
FIG. 2 shows a schematic illustration of an insert part according to the invention for a welding electrode.

FIG. 2 shows a schematic illustration of an insert part 100 according to the invention, which has a welding plate 140. The welding protrusion 110 according to the invention, which has substantially the contour of the contacting face 120 according to the invention, is disposed on the front side of the welding plate 140 that faces the element to be welded (in this case an interconnector). The welding protrusion 110 according to the invention extends from the front side of the welding plate 140 toward the contacting face, and is in particular configured so as to taper toward the latter. The welding protrusion 110 here, on the lower side in FIG. 2, has a recess 130, as a result of which the contacting face 120 is imparted the above-mentioned specific shape according to the invention.

As shown in FIG. 2, the recess 130 has substantially a prismatic shape with a symmetrical trapezoid as a footprint. The welding protrusion 110 has at least substantially a prismatic shape with a round-fronted rectangle as a footprint, part of the latter missing in the design of the recess 130 such that the welding protrusion 110 has the contacting face 120 with a cross section of a (inverted) short-legged "U". The contacting face 120 can likewise have substantially a C-shape or a U-shape.

However, it is likewise conceivable that the contacting face 120 has a different shaping. In this context it is only important that welding of interconnectors can be achieved in which the area proportion of plastics inclusions is less than 8%, in particular less than (or equal to) 4%, of the total welding area, and wherein the weld withstands a (torsional) torque of at least 12 Nm. In other words, the welding area may have at most an area proportion of 8%, preferably less than 4%, of plastics inclusions and must withstand a torsional torque of at least 12 Nm before the weld fails.

This takes place in particular by simulating the welding procedure with the conventional insert part 100' by means of an FEM method, in which the weak points of the conventional welding protrusion 110' and of the conventional contacting face 120' are detected and evaluated. This takes place in particular to the effect that a correlation is determined between the stresses and temperatures that arise during the welding procedure and the plastics inclusions that arise in the welding area generated (and the position of said plastics inclusions in the welding area). Based on these results, an alternative shaping of the contacting face 120 according to the invention is then determined, in which the weak points can be prevented or at least reduced. In this context, weak points are understood to mean regions in which high stresses and/or temperatures arise during the welding procedure in a region about the opening in the housing partition, and where plastics inclusions increasingly arise in the welding area produced after the welding procedure has been carried out.

Figure 3:
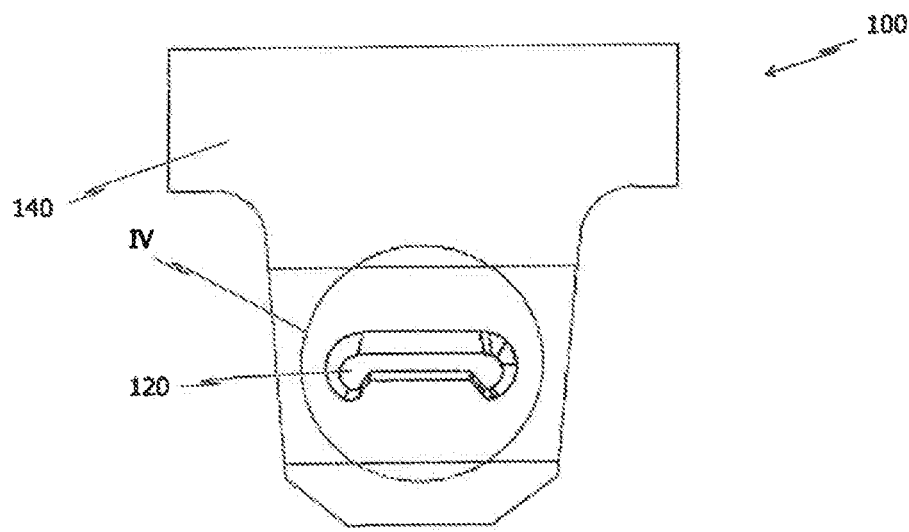
FIG. 3 shows a schematic illustration of a front view of the insert part according to the invention for a welding electrode.

FIG. 3 shows the front view of an insert part 100 according to the invention for the welding electrode. The welding plate 140 here has substantially the shape of a "T". An alignment of the insert part 100 according to the invention on the welding electrode can in particular already be provided or configured by such a shaping.

Figure 4:
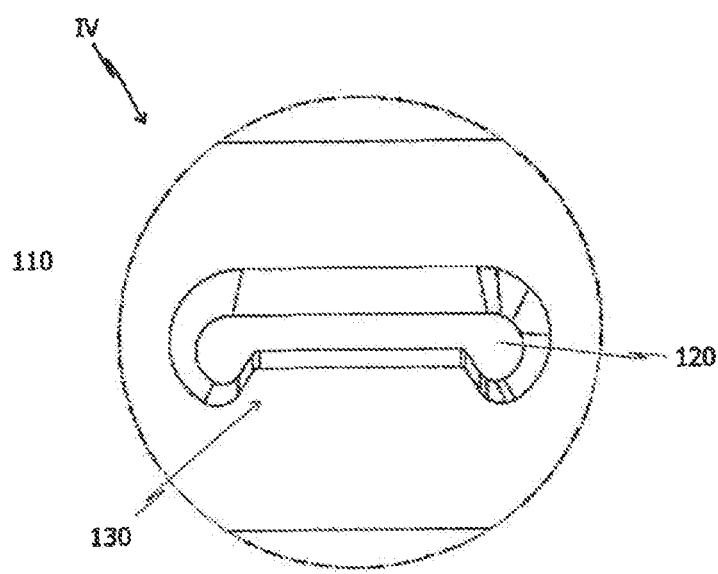
FIG. 4 shows a detailed view of the welding protrusion according to the invention.

Furthermore indicated in FIG. 3 by a circle is a region which in FIG. 4 is shown in more detail in a detailed view IV.

FIG. 4 shows the detailed view IV of the welding protrusion 110 according to the invention indicated in FIG. 3, having the recess 130 and the contacting face 120 according to the invention.

Figure 5:
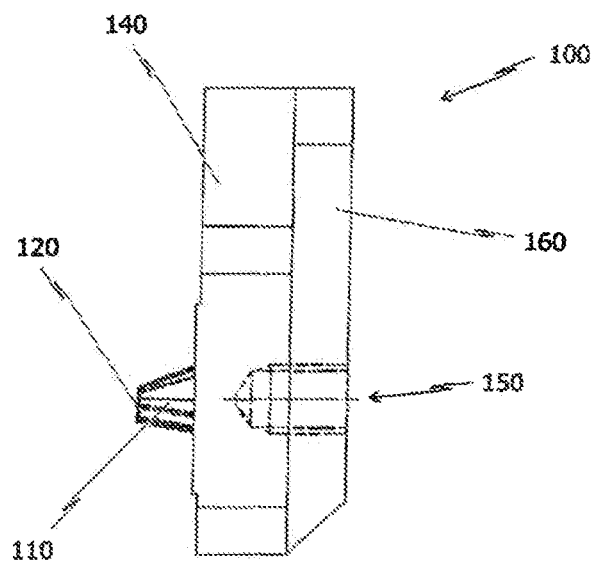
FIG. 5 shows a schematic illustration of a lateral view of an insert part according to the invention for a welding electrode.

FIG. 5 shows a lateral view of the insert part 100 according to the invention. It can be seen here that an elevation 160, which has substantially the shape of a feather key formed with a round end on one side, is configured on a rear side of the welding plate 140, specifically the side that is opposite the welding protrusion 110.

Furthermore, a fastening bore 150 having a thread, with the aid of which the insert part 100 can be fastened to the welding electrode, specifically with the aid of a screw, is disposed in the insert part 100, said fastening bore 150 penetrating the elevation 160 and terminating in the welding plate 140.

As a result, the insert part 100 can be changed or replaced easily and quickly, which on the one hand lowers the tool costs, since the entire welding electrode arrangement or the entire welding electrode does not have to be exchanged, and on the other hand the time required for exchanging or changing the insert part 100 is reduced, which can lower production costs and, for example, prevent or at least shorten a production stop.

The fastening bore 150 is in particular disposed so as to be substantially at the level of the welding protrusion 110.

Figure 6:
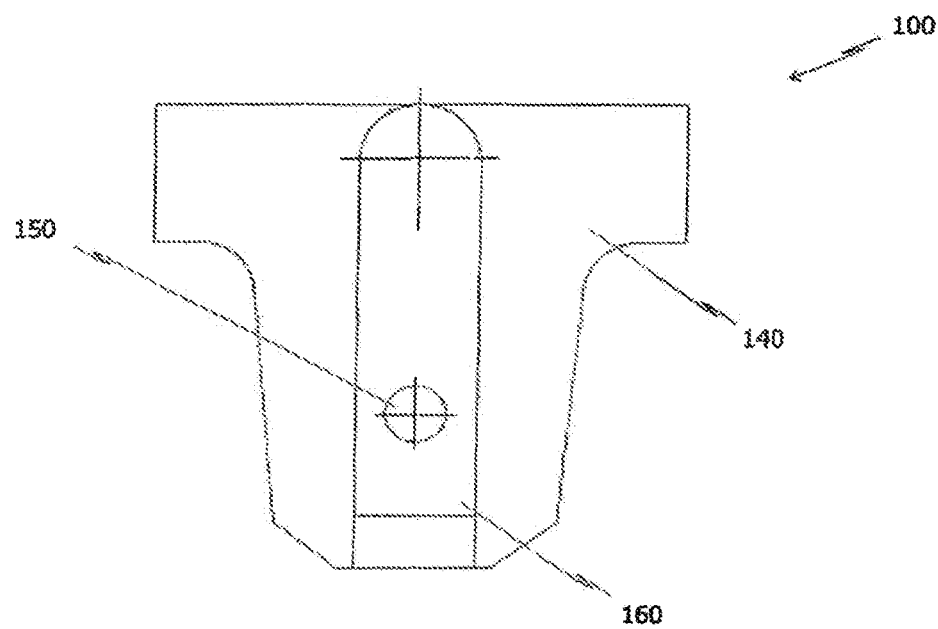
FIG. 6 shows a schematic illustration of a rear view of the insert part according to the invention for a welding electrode.

FIG. 6 shows a rear view of the insert part 100, on which the rear side of the welding plate 140 can be seen. In FIG. 6 the shape of the elevation 160 can furthermore be seen in more detail, said elevation 160 being semicircular at an upper end and having a bevel at a lower end.

The elevation 160 here can be introduced into a groove, configured so as to be correspondingly complementary, in the welding electrode, as a result of which the insert part 100 can be centered on the welding electrode. Subsequently, a screw can be screwed through the welding electrode and into the fastening bore 150 of the insert part 100 so as to fasten the insert part 100 to the welding electrode.

The insert part 100 according to the invention can thus be easily assembled and disassembled on welding electrodes, which leads to improved handling or simpler handling, and thus reduces assembly costs and the susceptibility to errors during assembly. Furthermore, welding electrodes that have already been put into operation can be retrofitted simply, inexpensively and quickly with the insert part 100 according to the invention. In particular, it is not necessary to replace all of the welding electrodes; instead, it is sufficient to just replace the conventional insert part 100' with the insert part 100 according to the invention. In particular, this can take place within a replacing time of less than 5 minutes.

With the aid of the insert part 100 according to the invention, the interconnectors of the electrochemical cells of the lead-acid rechargeable battery 10 can thus be welded in such a manner that the area proportion of plastics inclusions in the welding area between the interconnectors is at most 8%, in particular less than 8%, particularly preferably at most 4% or less of the entire welding area, with the strength of the weld between the interconnectors being at the same time configured in such a manner that the weld can withstand a torsional torque of at least 12 Nm, in particular at least 16 Nm (without failing).

For example, by using the insert part 100 according to the invention having an opening with an area in the order of 90 $mm^2$ to 100 $mm^2$, the area proportion of plastics inclusions in the welding area can be reduced from 36 $mm^2$ to 51 $mm^2$ down to 0 $mm^2$ to 15 $mm^2$, preferably down to 0 $mm^2$ to 5 $mm^2$.

At this point, it should be pointed out that all parts and/or features described above, in particular the details illustrated in the drawings, are claimed as being essential to the invention, individually or in respective combination. Modifications thereto are known to the person skilled in the art and intended in the concept on which this application is based.

LIST OF REFERENCE SIGNS

V Vehicle
10 Rechargeable battery
100 Insert part for a welding electrode
110 Welding protrusion
120 Contacting face
130 Recess
140 Welding plates
150 Fastening bore
160 Elevation
100' Conventional insert part for a welding electrode
110' Conventional welding protrusion
120' Conventional contacting face
140' Conventional welding plate

The invention claimed is:

1. A method for welding in each case one interconnector of two adjacent electrochemical cells of a rechargeable battery,
wherein the two adjacent electrochemical cells are disposed so as to be separated from one another by a housing partition, wherein the interconnectors are disposed so as to face one another on two opposite sides of the housing partition, wherein an opening is disposed in a region of the housing partition where the interconnectors are opposite to one another,
wherein the method comprises the following steps:
contacting the interconnectors with a welding electrode arrangement, wherein the welding electrode arrangement has at least one pair of welding electrodes, wherein one welding electrode of the at least one pair of welding electrodes contacts in each case one of the interconnectors by an insert part,
welding the interconnectors in such a manner that, by a pressure applied by the insert parts of the welding electrodes and a current applied to the welding electrode arrangement, material of the interconnectors melts at least in regions and is connected in a materially bonded manner through the opening in the housing partition, specifically so that a generated welding area has an area proportion of plastics inclusions of at most 8% in the welding area, and
wherein the insert part has been calculated and simulated using a finite element method.

2. The method as claimed in claim 1,
wherein the area proportion of plastics inclusions in the welding area is less than 8%.

3. The method as claimed in claim 1, wherein the insert part of each welding electrode has a welding protrusion which has a shape which has been calculated and simulated in such a manner that the area proportion of plastics inclusions in the welding area is less than 8% of the welding area.

4. The method as claimed in claim 3, wherein the welding protrusion has a recess so that a cross section of the welding protrusion is at least substantially U-shaped or C-shaped.

5. The method as claimed in claim 3, wherein the welding protrusion has a contacting face which has an at least substantially U-shaped or C-shaped cross section, wherein the welding protrusion is configured so as to taper toward the contacting face.

6. The method as claimed in claim 1, wherein the interconnectors are welded by a through-the-partition (TTP) welding method.

7. The method as claimed in claim 1, wherein the interconnectors are welded at a welding temperature of 300° C. to 380° C.

8. The method of claim 7, wherein the interconnectors are welding at the welding temperature of 300° C. to 320° C.

9. The method as claimed in claim 1, wherein the housing partition is made of plastics material which has a melting point of 200° C. to 250° C.

10. The method as claimed in claim 9, wherein the housing partition is made of polyethylene, polypropylene, polyamide, polyoxymethylene or a copolymer thereof.

11. The method as claimed in claim 1, wherein the welded interconnectors withstand a torque of at least 12 Nm.

12. The method as claimed in claim 11, wherein the welded interconnectors withstand the torque of at least 16 Nm.

13. The method as claimed in claim 1, wherein the area proportion of plastics inclusions in the welding area is less than 4%.

14. The method of claim 1, wherein the insert part of each welding electrode has a welding protrusion which has a shape which has been calculated and simulated in such a manner that the area proportion of the plastics inclusions in the welding area is less than 4% of the welding area.

15. A method for welding in each case one interconnector of two adjacent electrochemical cells of a rechargeable battery,
wherein the two adjacent electrochemical cells are disposed so as to be separated from one another by a housing partition, wherein the interconnectors are disposed so as to face one another on two opposite sides of the housing partition,
wherein an opening is disposed in a region of the housing partition where the interconnectors are opposite to one another,
wherein the method comprises the following steps:
contacting the interconnectors with a welding electrode arrangement, wherein the welding electrode arrangement has at least one pair of welding electrodes, wherein one welding electrode of the at least one pair of welding electrodes contacts in each case one of the interconnectors by an insert part,
welding the interconnectors in such a manner that, by a pressure applied by the insert parts of the welding electrodes and a current applied to the welding electrode arrangement, material of the interconnectors melts at least in regions and is connected in a materially bonded manner through the opening in the housing partition, specifically so the insert part of each welding electrode having a welding protrusion which has a shape which has been calculated and simulated in such a manner that a generated welding area has an area proportion of plastics inclusions of at most 8% in the welding area, and
wherein the welding protrusion has a recess so that a cross section of the welding protrusion is at least substantially U-shaped or C-shaped.

16. The method as claimed in claim 15, wherein the area proportion of plastics inclusions in the welding area is less than 8%.

17. The method as claimed in claim 15, wherein the area proportion of plastics inclusions in the welding area is less than 4%.

18. The method as claimed in claim 15, wherein the insert part has been calculated and simulated using a finite element method.

19. The method as claimed in claim 15, wherein the welding protrusion has a contacting face which has an at least substantially U-shaped or C-shaped cross section, wherein the cross section along the welding protrusion is configured to taper toward the contacting face.

20. The method as claimed in claim 15, wherein the interconnectors are welded by a through-the-partition (TTP) welding method.

21. The method as claimed in claim 15, wherein the interconnectors are welded at a welding temperature of 300° C. to 380° C.

22. The method of claim 21, wherein the interconnectors are welding at the welding temperature of 300° C. to 320° C.

23. The method as claimed in claim 15, wherein the housing partition is made of plastics material which has a melting point of 200° C. to 250° C.

24. The method as claimed in claim 23, wherein the housing partition is made of polyethylene, polypropylene, polyamide, polyoxymethylene or a copolymer thereof.

25. The method as claimed in claim 15, wherein the welded interconnectors withstand a torque of at least 12 Nm.

26. The method as claimed in claim 25, wherein the welded interconnectors withstand the torque of at least 16 Nm.

27. The method of claim 15, wherein the insert part of each welding electrode has the welding protrusion which has the shape which has been calculated and simulated in such a manner that the area proportion of the plastics inclusions in the welding area is less than 4% of the welding area.

* * * * *